United States Patent
Kaskawitz et al.

(10) Patent No.: US 7,891,161 B2
(45) Date of Patent: Feb. 22, 2011

(54) TWO-STEP BAIL APPARATUSES AND METHODS

(75) Inventors: Scott Kaskawitz, Burlington, NC (US); Vincent Prinzo, Hillsborough, NC (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/834,938

(22) Filed: Aug. 7, 2007

(65) Prior Publication Data

US 2009/0038281 A1    Feb. 12, 2009

(51) Int. Cl.
*A01D 69/00* (2006.01)
(52) U.S. Cl. ............................ 56/10.8; 56/11.3; 56/11.8
(58) Field of Classification Search .................. 56/10.8, 56/10.2 R, 10.5, 11.2, 11.3, 11.8, 14.7, 16.7, 56/DIG. 6, DIG. 18; 180/19.1–19.3, 277–279, 180/281; 74/551.3, 551.5–551.7, 501.6, 74/502; 172/42, 364; 37/234, 244, 245, 37/257, 263
See application file for complete search history.

(56) References Cited

U.S. PATENT DOCUMENTS

| | | | |
|---|---|---|---|
| 2,813,433 A * | 11/1957 | Adams, Jr. et al. ............. 476/17 |
| 4,270,402 A * | 6/1981 | Nagano .................... 74/473.14 |
| 4,281,732 A | 8/1981 | Hoch |
| 4,327,539 A | 5/1982 | Bricko et al. |
| 4,413,466 A | 11/1983 | Beugelsdyk et al. |
| 4,430,848 A * | 2/1984 | Wistrom ..................... 56/11.3 |
| 4,573,307 A | 3/1986 | Wick |
| 4,614,130 A * | 9/1986 | Heismann et al. ........ 74/501.5 R |
| 4,667,459 A | 5/1987 | Scanland et al. |
| 5,195,307 A * | 3/1993 | Thorud et al. ................. 56/11.3 |
| 5,784,868 A * | 7/1998 | Wadzinski et al. ........... 56/10.8 |
| 6,751,936 B2 * | 6/2004 | Kucera et al. ................ 56/10.8 |
| 6,796,392 B2 * | 9/2004 | Kobayashi et al. ......... 180/19.3 |
| 7,178,322 B2 * | 2/2007 | Osborne ..................... 56/10.8 |
| 2003/0056481 A1 * | 3/2003 | Trefz ........................... 56/11.1 |
| 2005/0279066 A1 * | 12/2005 | Osborne ..................... 56/10.8 |
| 2006/0053763 A1 * | 3/2006 | Stover et al. ................. 56/16.7 |
| 2006/0218887 A1 * | 10/2006 | Osborne ..................... 56/10.8 |
| 2007/0101690 A1 * | 5/2007 | Stover et al. ................. 56/11.3 |
| 2007/0114076 A1 * | 5/2007 | Osborne .................... 180/19.3 |
| 2007/0130899 A1 * | 6/2007 | Osborne ..................... 56/10.8 |

* cited by examiner

*Primary Examiner*—Thomas B Will
*Assistant Examiner*—Joan D Misa
(74) *Attorney, Agent, or Firm*—Jenkins, Wilson, Taylor & Hunt, P.A.

(57) ABSTRACT

Apparatuses and methods are provided for actuating a control component of a power machine. A two-step bail can be attached to a handle for controlling the power machine. The two-step bail can include a base member and a control member, wherein the control member can be slidably attached to the base member which can be pivotably mounted to the handle of the power machine. The control member can be depressed, by an operator first action, into the base member, which can be followed by an operator second action wherein the base member and control member can be pulled reward toward the operator to actuate a control component of the power machine.

23 Claims, 5 Drawing Sheets

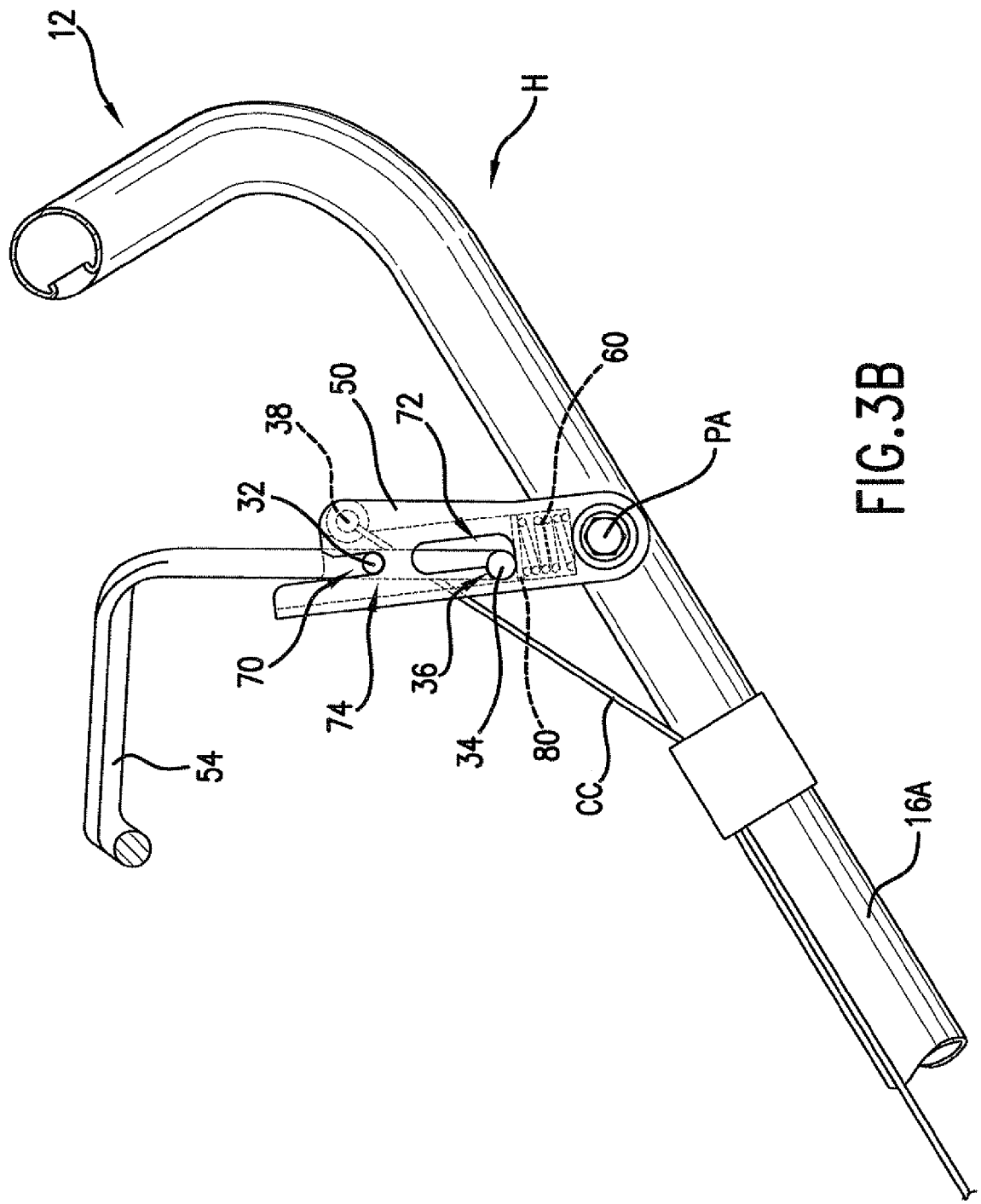

TWO-STEP BAIL APPARATUSES AND METHODS

TECHNICAL FIELD

The subject matter disclosed herein relates generally to bail apparatuses and methods for using a bail to control a power machine. More specifically, the subject matter disclosed herein relates to two-step bail apparatuses and methods of controlling control components of power machines, such as a blade brake clutch on a mowing machine, using a two-step bail.

BACKGROUND

Power machines, particularly walk-behind power machines, often employ an operator control handle or bail to actively control a component of the power machine. In addition to providing a means of controlling the power machine, the bail is often employed to enforce operator presence for safety reasons. For example, it is a requirement for walk-behind power mowing machines to have a "dead man" control, which generally includes a spring-biased bail which can be grasped by the operator during normal operation of the machine to enable the motor of the machine. If the bail is thereafter released, the machine action is rapidly terminated for reasons of safety. In the case of a "dead man" control on a lawn mower, the engine and the rotating blade are both rapidly stopped when the operator releases the bail.

More recently, blade brake clutch (BBC) control apparatuses have been employed to enforce operator presence while using lawn mowers. A BBC control allows the rotating cutting blade to be stopped and engine to remain enabled when the operator releases the bail controlling the BBC. When the bail is moved to the engaged position, the BBC control activates the clutch whereby the cutting blade is engaged. When the bail is released by the operator, the BBC control disengages the clutch and the brake mechanism is applied to stop rotation of the blade. This action prevents the blade from free spinning to a stop, in which an injury could occur to the user while the blade slows from an extremely high velocity of rotation.

It is now a requirement that bails on walk-behind lawn mowers designed to enforcing operator presence comprise a two-step apparatus such that a user must perform a two-step process before the blade can be engaged for rotation. Thus, a two-step bail apparatus for a lawn mower would provide for operator control of the mowing machine as well as conform to safety regulations.

SUMMARY

According to the present disclosure, novel two-step bail apparatuses and methods are provided for controlling a power machine, such as a mowing machine.

It is therefore an object of the present disclosure to provide novel apparatuses and methods for controlling a control component of a mowing machine or other power machine via a two-step bail apparatus. An object having been stated hereinabove, and which is achieved in whole or in part by the subject matter disclosed herein, other objects will become evident as the description proceeds when taken in connection with the accompanying drawings as best described hereinbelow.

BRIEF DESCRIPTION OF THE DRAWINGS

A full and enabling disclosure of the present subject matter including the best mode thereof to one of ordinary skill in the art is set forth more particularly in the remainder of the specification, including reference to the accompanying figures in which:

FIG. 3B illustrates a cross-sectional side view of the two-step bail apparatus according to FIG. 2 in an intermediate position.

DETAILED DESCRIPTION

Reference will now be made in detail to presently preferred embodiments of the present subject matter, one or more examples of which are shown in the figures. Each example is provided to explain the subject matter and not as a limitation. In fact, features illustrated or described as part of one embodiment can be used in another embodiment to yield still a further embodiment. It is intended that the present subject matter cover such modifications and variations.

Figure 1:
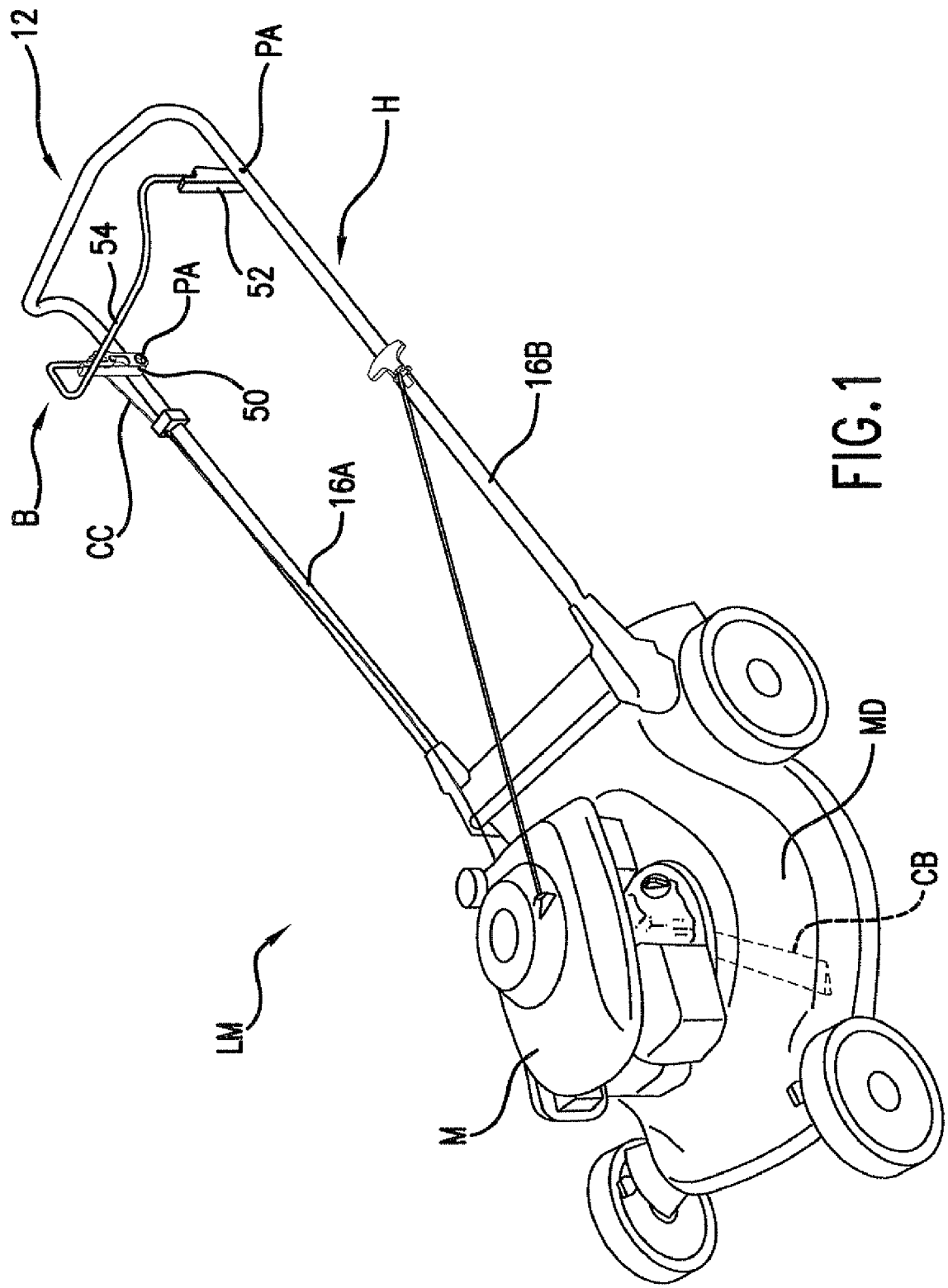
FIG. 1 illustrates a perspective view of a lawn mower having a two-step bail apparatus provided in accordance with the subject matter disclosed herein.

Referring now to FIG. 1, a lawn mowing machine generally designated LM is illustrated by way of example. Lawnmower LM can comprise any suitable configuration generally known to persons skilled in the art or later developed. In one aspect, lawnmower LM can comprise a housing such as a mower deck MD, which can include a front portion, a rear portion, an upper exterior portion, and a lower, interior portion. A handle generally designated H can be coupled to the rear portion of mower deck MD by any suitable means, and can extend upwardly therefrom at an angle appropriate for comfortable grasping and manipulation by an operator. Handle H provides an area to be gripped by an operator and can include a proximal end section, generally designated 12, which can be the section farthest away from the main operational components of lawnmower LM, such as prime mover or motor M. In one aspect, handle H can be generally U-shaped comprising first and second spaced-apart legs 16A and 16B, respectively, attached to the proximal end section 12. The different types, structures, and functions of components of lawnmower LM in addition to those described above are known to persons skilled in the art, and therefore are not further described.

As illustrated in FIG. 1, lawnmower LM can include a bail generally designated B, or operator presence control, which can be pivotably coupled or attached to handle H at a suitable pivot axis PA that can comprise an axle, pin, bolt, dowel, or the like. Bail B can be disposed at or near proximal end section 12 of handle H (i.e., the portion of handle H proximate to an operator in the course of typical use of lawnmower LM) to facilitate manipulation by an operator Bail B can communicate with a machine control component, wherein the machine control component can comprise an engine, transmission, blade brake clutch control or the like as appreciated by those skilled in the art. Bail B can communicate with a machine control component through a linking member or control cable CC. Control cable CC can be any suitable elongate component, of cable or non-cable material, that can be either flexible or ridged and capable of transferring a force or actuation by translation and/or a change in tension. A non-limiting example of control cable CC is a cable, at least a portion of which is typically encased and extends through a coaxial sheath.

As appreciated by persons skilled in the art, bail B in general is a safety feature that is typically movable between two positions, ON and OFF, and typically is biased towards the OFF position. When an operator is operating or manipulating lawnmower LM in an intended matter, such as by properly gripping the proximal end section 12 of handle H and pulling bail B toward the proximal end section 12 of handle H, bail B is in the ON position (FIG. 3C), and this action translates through the length of control cable CC to a machine control component (not shown). The ON position permits activation of a machine control component, for example, a cutting element (blade) and/or transmission.

When, on the other hand, an operator is not operating or manipulating lawnmower LM in an intended matter, such as by releasing or failing to properly grip bail B, bail B can be in the OFF position (FIGS. 1, 2, 3A and 3B). This OFF position disables a machine control component. In some aspects and as known to those of skill in the art, a biasing mechanism (not shown) can be employed to bias bail B to the OFF position. For example, control cable CC could be biased at some point along its length to maintain a force that tends to pull bail B away from the proximal end section of handle H to the angled OFF position (as illustrated in FIG. 1). As another example, a biasing force could be applied to a machine control component (not shown) and transferred through control cable CC to yield the same result.

Figure 2:
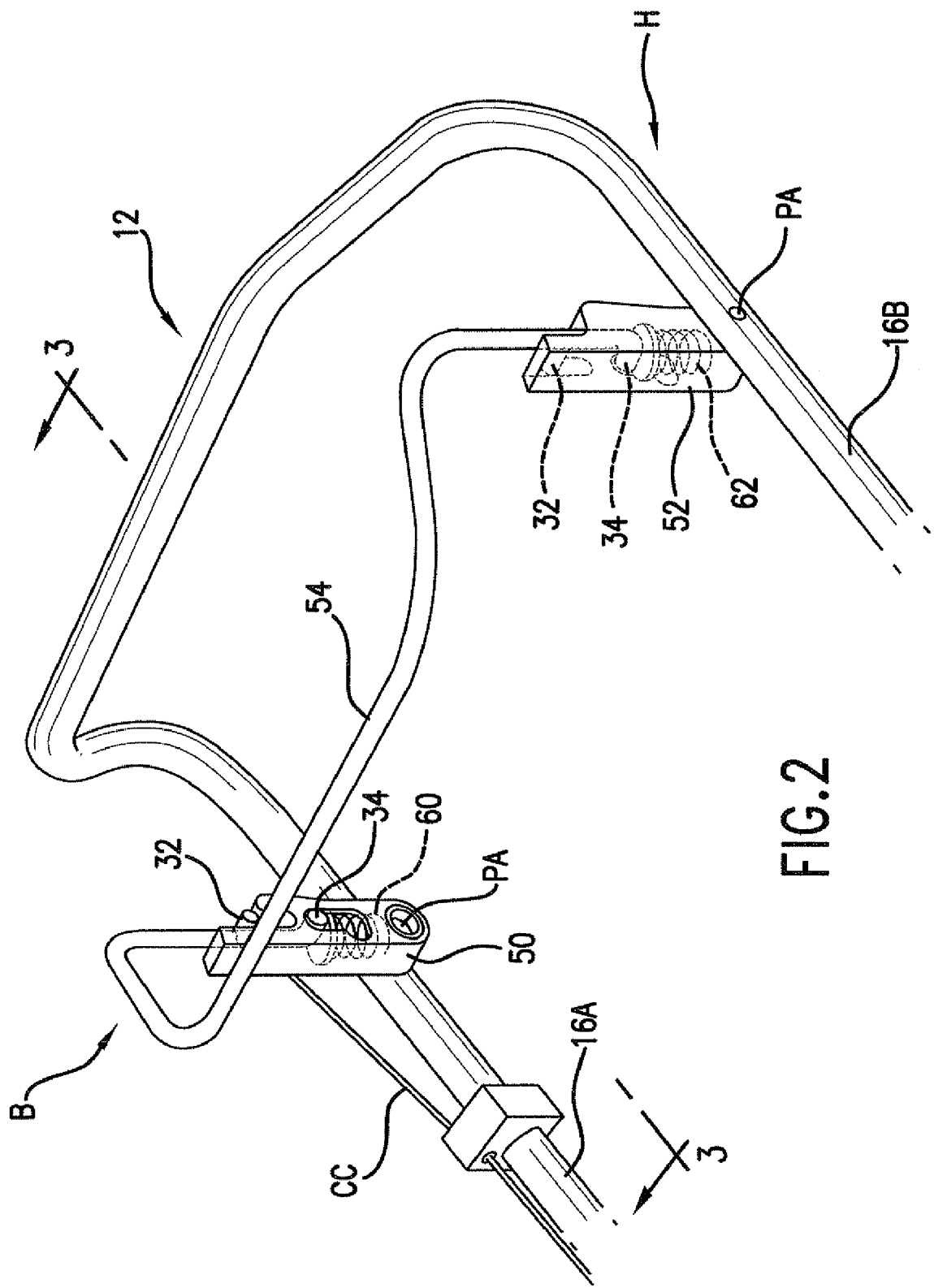
FIG. 2 illustrates a partial perspective view of a lawn mower having a two-step bail apparatus in accordance with the subject matter disclosed herein.

In accordance with the present subject matter, bail B, as illustrated in FIG. 2, can comprise a first base member 50, a second base member 52 and a control member 54, wherein first base member 50, second base member 52 and control member 54 form a two-step bail. Accordingly, first base member 50 can be pivotably attached to leg 16A of handle H at pivot axis PA and second base member 52 can be pivotably attached to leg 16B of handle H at pivot axis PA, while control member 54, coupled thereto, can be a substantially elongated rod shaped or tubular structure substantially spanning the distance between spaced-apart legs 16A and 16B of handle H. Bail B can also comprise a first biasing member 60 and second biasing member 62 positioned within first base member 50 and second base member 52, respectively.

In another aspect, bail B can comprise first base member 50 and control member 54 wherein the operator can operate bail B with only one hand. In such an aspect, control member 54 would not fully extend between legs 16A and 16B of handle H.

With continuing reference to FIG. 2, control member 54 can comprise a plurality of tabs 32 and a plurality of projections 34. Tabs 32 and projections 34 can be configured to be in communication with first and second base members 50, 52. Tabs 32 can extend from control member 54 in an orthogonal direction or any other suitable direction. Projections 34 can form the terminating ends of control member 54 and can be generally L-shaped. Tabs 32 and projections 34 can extend in substantially the same direction.

Figure 3A:
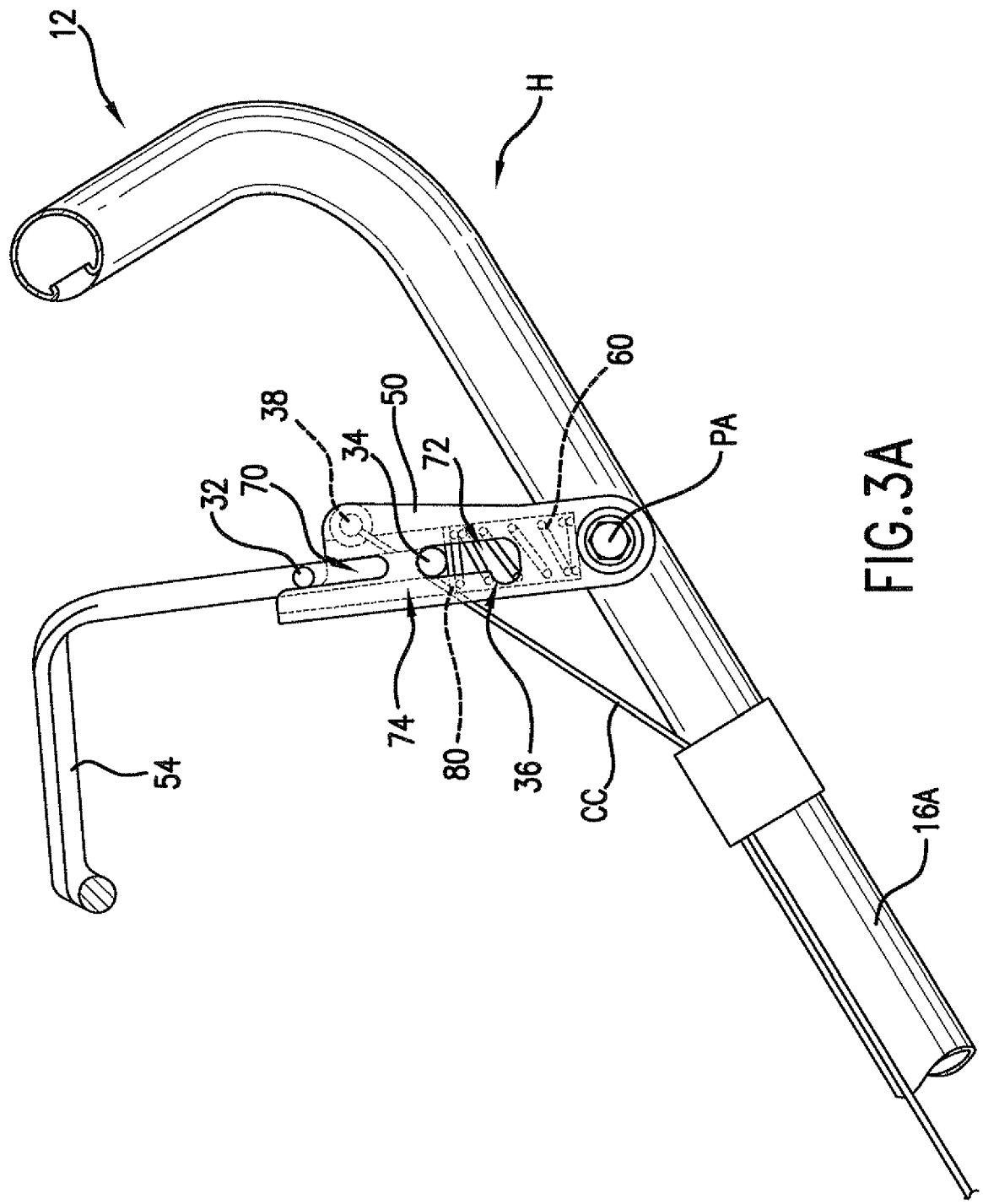
FIG. 3A illustrates a cross-sectional side view of the two-step bail apparatus according to FIG. 2 in a disengaged position.
Figure 3C:
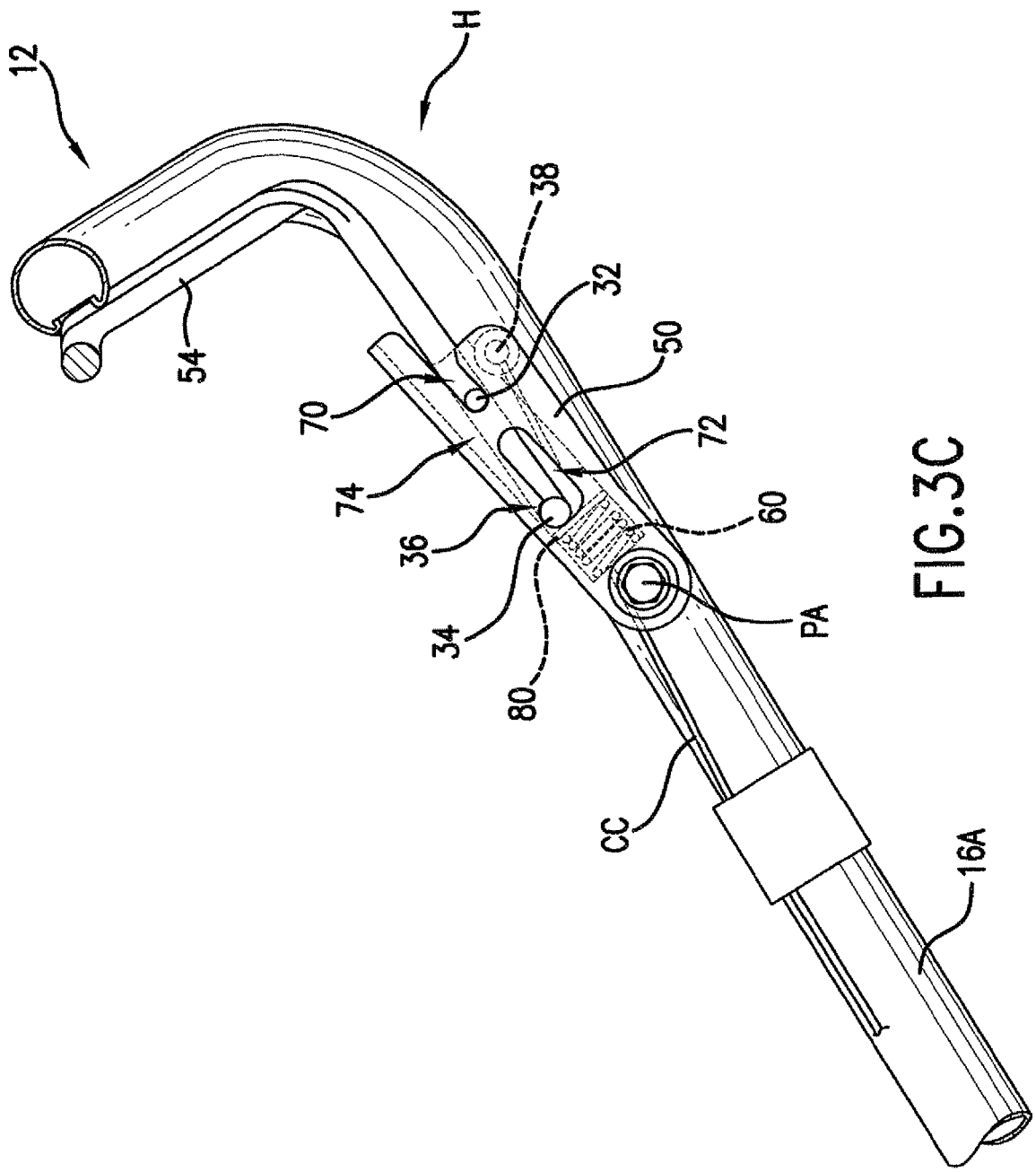
FIG. 3C illustrates a cross-sectional side view of the two-step bail apparatus according to FIG. 2 in an engaged position.

FIGS. 3A-3C illustrate cross-sectional views of the present disclosure and as such only show the workings of first base member 50 in relation to leg 16A. To that end, second base member 52 and leg 16B are not shown but can be configured to operate in the same manner as described with reference to first base member 52. As illustrated in FIGS. 3A-3C, first base member 50 can be pivotably attached to handle H at a pivot axis PA which can comprise an axle, pin, bolt, dowel, or the like, as would be appreciated by one of ordinary skill in the art. First base member 50 can comprise an elongated body having an interior space acting as a sleeve generally designated 74 for receiving control member 54. First biasing mechanism 60 can be positioned within sleeve 74.

Further, first base member 50 can define an upper channel generally designated 70 and a lower channel generally designated 72. Upper channel 70 can slidingly receive tab 32, while lower channel 72 can slidingly receive projection 34. Lower channel 72 can include a notch generally designated 36 for lockably receiving projection 34 in a lateral direction. A plate 80 can be positioned above and supported by first biasing member 60 within sleeve 74 of first base member 50. As an example, first and second biasing members 60, 62 can comprise a spring or any other suitable biasing mechanism. Control cable CC can attach to first base member 50 at a coupling 38, whereby first base member 50 can be operatively linked to actuate a control component of a power machine such as, for example, actuating a cutting blade CB (FIG. 1) attached to lawnmower LM.

As further illustrated in FIGS. 3A-3C, control member 54 can be substantially L-shaped from a side profile or any other suitable configuration. Projections 34 can form the terminating ends of control member 54. Continuing with reference to FIGS. 3A-3C, projection 34 can be disposed in sleeve 74 of first base member 50, thereby slidably coupling control member 54 to first base members 50. Projection 34 can fit into lower channel 72 of first base member 50, wherein projection 34 can permit control member 54 to be slidably coupled to first base member 50. Projection 34 of control member 54 can rest on plate 80, which can be supported by first biasing member 60. Control member 54 can further comprise tab 32, which can extend perpendicular from control member 54 and parallel to projection 34 of control member 54. Tab 32 can be configured to slidably fit into upper channel 70 of first base member 50.

Bail B is movable between OFF and ON positions. The OFF or disengaged position is illustrated in FIG. 3A, wherein first base member 50 can be substantially vertical and perpendicular to leg 16A of handle H. Although only first base member 50 attached to leg 16A is illustrated in FIGS. 3A, 3B and 3C, it will be understood that both first and second base members 50, 52 can be attached to legs 16A and 16B of handle H to operate in unison as first and second base members 50, 52 can be linked by control member 54.

Referring to FIG. 3A, in the OFF position, control member 54 can be biased by first biasing member 60 to a substantially elevated position and fully extended within sleeve 74 of first base member 50 in a first extended position. While allowing the terminal end and projection 34 of control member 54 to slide within lower channel 72 of first base member 50, projection 34 can also maintain the terminal end of control member 54 within sleeve 74 of first base member 50 by engaging the upper most portion of lower channel 72 to effectively limit the extension of control member 54. Also, tab 32 can be positioned out of upper channel 70 when bail B is in the OFF position.

FIG. 3B illustrates the first step of the two-step process of engaging bail B to the ON position in one aspect of the present disclosure. Control member 54 can be substantially depressed to a second retracted position within sleeve 74 of first base member 50 such that first biasing member 60 can be substantially compressed. Accordingly, projection 34 of control member 54 can be aligned in notch 36 of lower channel 72 for locking therein. Tab 32 can be slidingly received within upper channel 70. The completed first step of the two-step process as illustrated in FIG. 3B can effectively couple control member 54 and first base member 50.

FIG. 3C illustrates the completed second step of the two-step process of engaging bail B, wherein bail B is in the ON or engaged position. Upon completion of the second step, first base member 50 and a portion of control member 54 can be substantially proximal and parallel to leg 16A in a disengaged position. Control member 54 can be L-shaped to be matingly received with proximal end section 12 of handle H. More particularly, first base member 50 and control member 54, now coupled thereto, can be pivoted at pivot axis PA such that first base member 50 can be substantially horizontal and parallel to leg 16A of handle H in an engaged position and L-shaped control member 54 can be proximal to proximal end section 12 of handle H. Upon completion of the second step of engaging the two-step bail, control cable CC can be substantially extended to operatively engage its coupled components to achieve a desired function such as, for example, actuating cutting blade CB or a blade brake clutch.

In accordance with the present subject matter, moving bail B from the OFF position to the ON position can require an operator to perform two distinct and sequential steps.

First, control member 54 can be pushed downward or depressed within sleeve 74 of first and second base members 50, 52 from a first extended position to a second retracted position. In pressing down control member 54, first biasing member 60 can be compressed, which can cause projection 34 of control member 64 to slide downward within lower channel 72 and into notch 36 while tab 32 can slide downward into upper channel 70, as illustrated in FIG. 3B. As a result, control member 54 can be coupled to first base member 50 such that the two components can be pivoted as one unit. The coupling of control member 54 and first base member 50 can be effectively achieved by permitting tab 32 of control member 54 to engage upper channel 70 of first base member 50, which can essentially lock first base member 50 and control member 54 so that the two can be leveraged as one unit.

The second step can comprise pulling or rotating control member 54 and first and second base members 50, 52 rearward towards the operator and proximal end section 12 of handle H, as shown in FIG. 3C, from a disengaged position to an engaged position. Proximal end section 12 of handle H can have substantially the same shape as control member 54 such that the two are matingly configured to provide ease of use for the operator. In pulling bail B rearward, the base member can be pivoted at pivot axis PA such that control cable CC can be extended such that control cable CC can perform its desired function. Upon completion of the second step, bail B can be in the ON position such that for example motor M can be engaged as well as the blade of lawnmower LM. Upon the operator releasing bail B, control member 54 and first base member 50 can rotate away at pivot axis PA from proximal end section 12 of handle H to the disengaged position. Projection 34 can release from within notch 36, which can thereby cause projection 34 and tab 32 to extend upwardly as first biasing mechanism 60 exerts an upward force as first biasing mechanism 60 decompresses into an uncompressed state. Thus, bail B can be in the OFF position, as shown in FIG. 3A.

Bail B can be configured such that both steps must be performed to successfully move bail B to the ON position and engage or actuate the control component. The act of pressing control member 54 downward causes the movement of tab 32 into upper channel 70, whereby control member 54 and first base member 50 can be coupled together. Alternatively, prior to the act of pressing down control member 54, pulling control member 54 rearward does not provide for the pivoting of first and second base members 50, 62 and thus does not cause control cable CC to be extended to actuate the control component.

When an operator is operating or manipulating lawn mower LM in an intended matter, such as by properly gripping handle H and pulling bail B toward handle H, bail B can be in the ON position, and this action can translate through the length of control cable CC to a machine control component. The ON position permits a machine control component to activate, for example, a cutting element or BBC control.

It will be understood that various details of the disclosed subject matter may be changed without departing from the scope of the disclosed subject matter. Furthermore, the foregoing description is for the purpose of illustration only, and not for the purpose of limitation.

What is claimed is:

1. An apparatus for controlling a walk-behind mowing machine, the apparatus comprising:
   a handle including a first leg and a second leg attached to the walk-behind mowing machine; and
   a two-step bail attached to the handle of the walk-behind mowing machine, the bail comprising:
      a base member having an elongated interior space, the base member pivotably attached to the first leg of the handle of the walk-behind mowing machine and being movable between a disengaged position and an engaged position to actuate a cutting blade;
      a control member comprising a substantially elongated rod shaped structure extending toward the second leg of the handle of the walk-behind mowing machine, a portion of the control member being located within the interior space, the entire control member being moveable in a linear direction with respect to the interior space between a first extended position and a second retracted position from the interior space, where in the second retracted position the control member is coupled with the base member such that the portion of the control member slides within the interior space to move the base member in a substantially arcuate direction to the engaged position.

2. The apparatus of claim 1, wherein the base member of the two-step bail is operatively connected to the cutting blade through a linking member.

3. The apparatus according to claim 1, comprising a biasing member positioned within the interior space of the base member for biasing the control member toward the first extended position.

4. The apparatus according to claim 3, wherein the biasing member comprises a spring.

5. The apparatus according to claim 1, wherein the control member is in a substantially perpendicular position relative to the handle when the base member is in the disengaged position.

6. The apparatus according to claim 1, wherein the control member is in a substantially parallel position relative to the handle when the base member is in the engaged position.

7. The apparatus according to claim 1, wherein the base member is in a substantially perpendicular position relative to the handle when in the disengaged position.

8. The apparatus according to claim 1, wherein the base member is in a substantially parallel position relative to the handle when in the engaged position.

9. The apparatus according to claim 1, wherein the control member is in the second retracted position when the base member is in the engaged position.

10. The apparatus according to claim 1, comprising a biasing member engaging the base member for biasing the base member toward the disengaged position.

11. The apparatus according to claim 1, wherein the portion of the control member comprises a tab.

12. The apparatus according to claim 1, wherein the base member further comprises a plurality of channels wherein at least a portion of the control member is positioned within at least one of the plurality of channels and the interior space.

13. A two-step bail to control a blade brake clutch on a walk-behind mowing machine, the two-step bail comprising:
the two-step bail attached to a handle of the walk-behind mowing machine and operatively linked to a blade brake clutch, the two-step bail comprising:
a base member having an elongated interior space, the base member pivotably attached to a first leg of the handle of the walk-behind mowing machine and being moveable between a disengaged position and an engaged position to actuate the blade brake clutch; and
a control member comprising a substantially elongated rod shaped structure extending toward a second leg of the handle of the walk-behind mowing machine, a portion of the control member is received within the interior space, is the entire control member being moveable in a linear direction with respect to the interior space between a first extended position and a second retracted position from the interior space, where in the second retracted position the control member is coupled with the base member such that the control member is slidable within the interior space to move the base member to the engaged position;
wherein the portion of the control member received within the interior space is movable downwardly within the interior space and the base member is moved from the disengaged position to the engaged position in a substantially arcuate direction to engage the blade brake clutch such that the blade brake clutch activates a cutting blade of the mowing machine and further wherein releasing the two-step bail disengages the blade brake clutch.

14. The apparatus according to claim 13, wherein the portion of the control member received within the interior space comprises a tab.

15. The apparatus according to claim 13, wherein the base member further comprises a plurality of channels wherein at least a portion of the control member is positioned within at least one of the plurality of channels and the interior space.

16. A method to control a power machine, comprising;
providing a power machine with a two-step bail and a control component, the two-step bail comprising:
a base member having an elongated interior space the base member pivotably attached to a first leg of a handle of the power machine and being movable between a disengaged position and an engaged position to actuate a cutting blade;
a control member attached to and slidably movable on the base member, a portion of the control member being located within the interior space, the control member comprising a substantially elongated rod shaped structure extending toward a second leg of the handle of the power machine, the entire control member being moveable with respect to the interior space between a first extended position and a second retracted position from the interior space, where in the second retracted position the control member is coupled with the base member such that the control member is then movable to move the base member to its engaged position;
moving the entire control member in a linear direction such that the portion of the control member is slidably moved within the interior space whereby the control member moves from the first extended position to the second retracted position; and
moving the base member in a substantially arcuate direction from the disengaged position to the engaged position, whereby the cutting blade of the power machine is actuated.

17. The method of claim 16, wherein the base member is substantially vertical and substantially perpendicular to the handle of the power machine in the disengaged position.

18. The method of claim 16, wherein the base member is substantially horizontal and parallel to the handle of the power machine in the engaged position.

19. The method of claim 16, wherein the power machine is a walk-behind mowing machine.

20. The method of claim 16, wherein the base member is operatively connected to the cutting blade of the power machine through a linking member.

21. The method of claim 16, further comprising biasing the two-step bail by engaging the base member with a biasing member whereby release of the control member by an operator results in the base member returning to the disengaged position.

22. The method of claim 21, wherein the step of biasing further comprises biasing the base member toward the disengaged position with the biasing member.

23. The method according to claim 16, further comprising biasing the control member toward the first extended position with a biasing member engaging the control member.

* * * * *